US008977602B2

(12) United States Patent
Shoens

(10) Patent No.: US 8,977,602 B2
(45) Date of Patent: Mar. 10, 2015

(54) OFFLINE VERIFICATION OF REPLICATED FILE SYSTEM

(75) Inventor: Kurt Alan Shoens, Los Altos, CA (US)

(73) Assignee: Oracle International Corporation, Redwood City, CA (US)

( * ) Notice: Subject to any disclaimer, the term of this patent is extended or adjusted under 35 U.S.C. 154(b) by 347 days.

(21) Appl. No.: 13/489,351

(22) Filed: Jun. 5, 2012

(65) Prior Publication Data

US 2013/0325824 A1 Dec. 5, 2013

(51) Int. Cl.
*G06F 17/30* (2006.01)

(52) U.S. Cl.
USPC .......................................... 707/698

(58) Field of Classification Search
USPC ................. 707/698, 687, 692, 679
See application file for complete search history.

(56) References Cited

U.S. PATENT DOCUMENTS

| 8,725,698 B2 * | 5/2014 | Prahlad et al. ................ 707/679 |
| 2012/0158670 A1 * | 6/2012 | Sharma et al. ................ 707/692 |
| 2014/0074804 A1 * | 3/2014 | Colgrove et al. ............. 707/692 |

* cited by examiner

*Primary Examiner* — Belix M Ortiz Ditren
(74) *Attorney, Agent, or Firm* — Marsh Fischmann & Breyfogle LLP; Daniel J. Sherwinter

(57) ABSTRACT

Embodiments of the invention include systems and methods for providing block-level verification of replicated file systems. Embodiments operate in context of data storage environments, which may typically have multiple file systems, snapshots of file systems, and replicas of file systems. In one illustrative scenario, a replica is created of a file system having multiple associated snapshots, and a user desires to verify the accuracy of the replica. A signature is created for each of the source active file system and the target replica file system, so that each signature includes records of both block-level signatures and block-level allocations. The signatures are compared to discover any differences. The differences may then be reconciled, where possible, to determine whether the differences indicate a corrupt or otherwise invalid replica.

20 Claims, 12 Drawing Sheets

OFFLINE VERIFICATION OF REPLICATED FILE SYSTEM

BACKGROUND

Embodiments relate generally to data storage environments, and, more particularly, to file system replication in data storage systems.

A file system is a collection of files and directories plus operations on them. To keep track of files, file systems have directories. A directory entry provides the information needed to find the blocks associated with a given file (e.g., or, typically, the directory entry includes an i-number that refers to an i-node, and the i-node includes information needed to find the blocks). Many file systems today are organized in a general hierarchy (e.g., a tree of directories) because it gives users the ability to organize their files by creating subdirectories. Each file may be specified by giving the absolute path name from the root directory to the file. Every file system contains file attributes such as each file owner and creation time and must be stored somewhere such as in a directory entry.

A snapshot of a file system will capture the content (e.g., files and directories) at an instant in time. A snapshot typically results in two data images: (1) the snapshot data (e.g., pointers, indices, metadata, etc. to record the contents of the file system at that moment in time); and (2) the active data that an application can read and write as soon as the snapshot is created (i.e., the active file system). Snapshots can be taken periodically, hourly, daily, weekly, on user demand, or at any other useful time or increment. They are useful for a variety of applications including recovery of earlier versions of a file following an unintended deletion or modification, backup, data mining, or testing of software.

A replica of a file system captures, not only the contents of files and directories, but also any other information associated with the file system. For example, if a file system has five snapshots, the replica will capture the contents of the active file system's data blocks and data relating to the five snapshots. Once a file system has been replicated, it may be desirable to verify that the replicated data is accurate. Traditional techniques for verifying a replicated file system typically traverse the file tree (e.g., the directory structure) to create fingerprints (e.g., hash checksums) of each file of both the source and replica file systems. The fingerprints can then be compared to detect any differences between the source and replicated files.

These traditional verification techniques can be limited in various ways. One such limitation is that it typically takes an appreciable amount of time and system resources to traverse the file tree. File-based traversal tends to involve non-sequential disk access and other functions. This can be resource-intensive, particularly in file systems having complex trees or large numbers of small files, or in sparse file systems, etc. Another such limitation is that the file-level verification typically cannot be made aware of inaccurate space allocations unless each snapshot of the file system is independently verified. For example, the file path may not include an indication of which blocks are allocated to which snapshots. Iterating separately over each snapshot can involve considerable amounts of redundancy and other inefficiencies.

BRIEF SUMMARY

Among other things, systems and methods are described for providing offline, block-level verification of replicated file systems. Embodiments operate in context of data storage environments, which may typically have multiple file systems, snapshots of file systems, and replicas of file systems. In one illustrative scenario, a replica is created of a file system having multiple associated snapshots, and a user desires to verify the accuracy of the replica (e.g., in case the replica is needed for disaster recovery, etc.). The file system service provider (referred to herein as "vendor") performs the verification at the block level. For example, while the user typically only has file level access to the file system, the vendor can perform block-level operations on the file system. A signature is created for each of the source active file system and the target replica file system, so that each signature includes records of both block-level signatures and block-level allocations. The signatures are compared to discover any differences. The differences may then be reconciled, where possible, to determine whether the differences indicate a corrupt or otherwise invalid replica. For example, some differences may result from changes in block allocations (e.g., which range of snapshots is associated with a particular block), and those differences may be acceptable in certain cases.

According to one set of embodiments, a method is provided for verifying a replicated file system. The method includes: generating a source signature dataset using a host computer system of a data storage environment by traversing through source data blocks of a source file system in such a way that the source signature dataset comprises, for each source data block, a fingerprint of the source data block and a space allocation for the source data block; generating a target signature dataset using the host computer system by traversing through target data blocks of a target file system in such a way that the target signature dataset comprises, for each target data block, a fingerprint of the target data block and a space allocation for the target data block; and verifying that the target file system is a valid replica of the source file system using the host computer system by verifying the fingerprint and the space allocation for each target data block according to the fingerprint and the space allocation for its respective source data block. In some such embodiments, generating the source signature dataset comprises traversing through the source data blocks of the source file system using substantially sequential disk access.

According to another set of embodiments, a data storage system is provided. The system includes: a number of source data blocks representing a source file system, each source data block having an associated content and an associated set of versions of the source file system to which the source data block is allocated; a number of target data blocks representing a target file system, each target data block having an associated content and an associated set of versions of the target file system to which the target data block is allocated, the target file system being a purported replica of the source file system; and a host computer system in communication with the source data blocks and the target data blocks. The host computer system is configured to: generate a source signature dataset by traversing through the source data blocks of the source file system in such a way that the source signature dataset comprises, for each source data block, a fingerprint of the source data block representing its associated content and a space allocation for the source data block representing its associated set of versions of the source file system to which it is allocated; generate a target signature dataset by traversing through the target data blocks of the source file system in such a way that the target signature dataset comprises, for each target data block, a fingerprint of the target data block representing its associated content and a space allocation for the target data block representing its associated set of versions of the target file system to which it is allocated; and verify that the target file system is a valid replica of the source file system by verifying the fingerprint and the space allocation for each target data block according to the fingerprint and the space allocation for its respective source data block.

BRIEF DESCRIPTION OF THE DRAWINGS

The present disclosure is described in conjunction with the appended figures.

Figure 1:
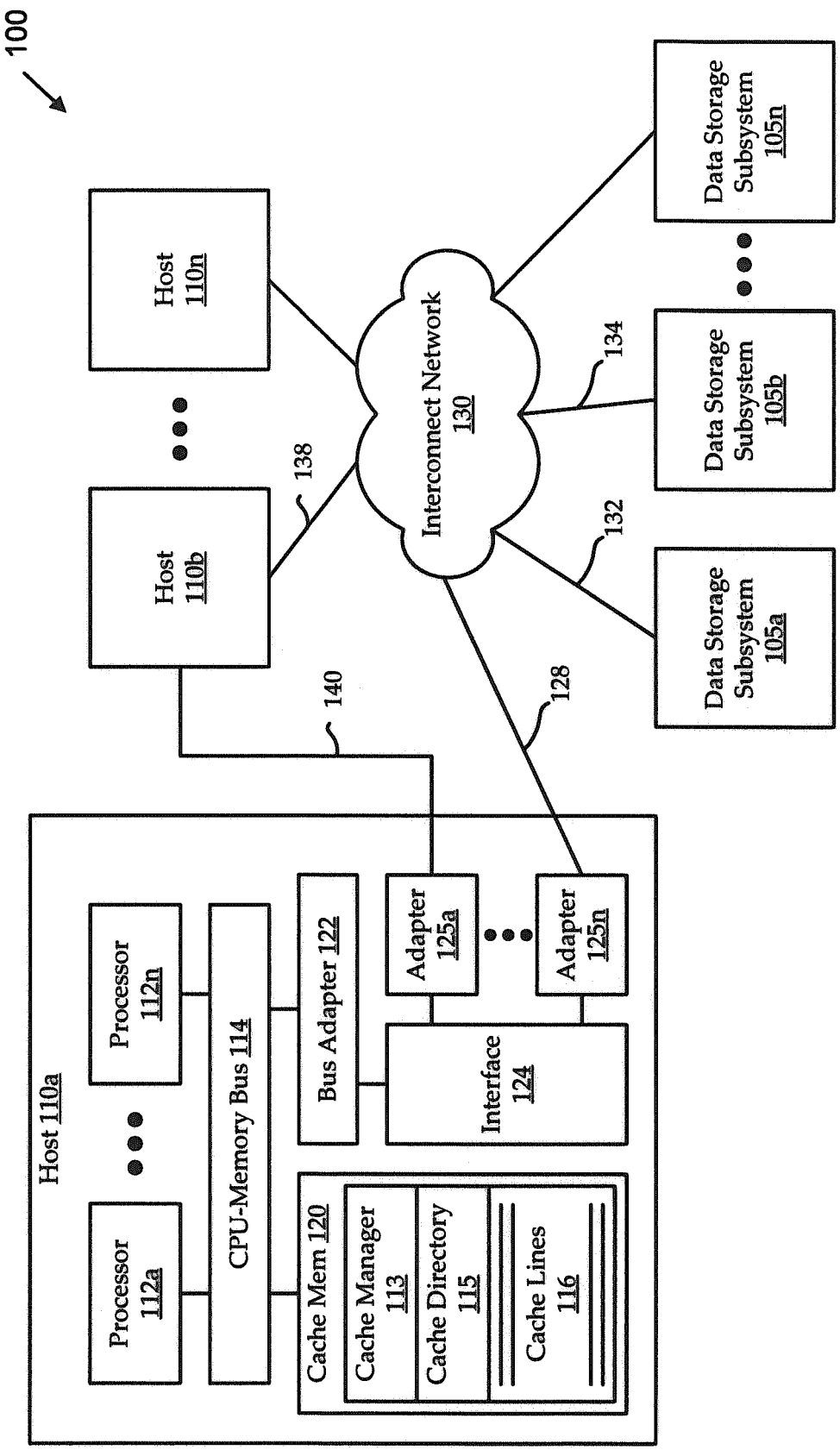
FIG. 1 shows a block diagram of an illustrative data storage system, including a number of hosts coupled to one or more data storage subsystems.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Users of large file systems often desire to perform operations outside the normal production use of the file system. For example, in addition to simply reading and writing files of a single active file system, users may desire to backup some or all of the file system, recover a previous version of the file system, preserve a version of the file system at some moment in time, etc. These and other functions can be supported by taking snapshots and/or replicas of the file system, which can capture the content of the active file system as well as certain other information.

As used herein, "snapshots" refer generally to pointer-based snapshots. Rather than copying some or all of the file system, the snapshot generates a snapshot image that points to blocks of the file system where data of the file system is already stored. When active file system data is changed, a check is made to determine whether the block is in use (e.g., being pointed to) by any snapshot images. If so, the block is copied to a new block and changed in the new location so as to preserve the original block as it was when the snapshot images that refer to it were generated. It will be appreciated that various techniques are needed to ensure that the active file system and all snapshot images point to the appropriate versions of blocks.

Accordingly, taking the snapshot typically results in both (1) snapshot image data (e.g., pointers, indices, metadata, etc. to record the contents of the file system at that moment in time) and (2) active file system data (e.g., the continuing version of the file system that an application can read and write as soon as the snapshot is created). As used herein, read-only versions of the file system generated by taking read-only snapshots are referred to as "R" followed by an index number, and active (writable) versions of the file system are referred to as "W" followed by an index number. For example, when a new file system is created for the first time, it may be referred to as "W1." If a snapshot of the active file system ("W1") is taken, the operation may result in a new, read-only version of the file system ("R1") and a new, active version of the file system ("W2"). Metadata is maintained to ensure that any changes made to the file system after the snapshot is taken do not impact the blocks being referred to by the snapshot (e.g., unless the snapshot is later removed, thereby releasing those blocks).

A number of techniques exist for managing the allocation of space in the storage devices, keeping track of the blocks of a given file, and making snapshots and their respective snapshot images of active file systems work efficiently and reliably. Some of these techniques are described in U.S. Pat. No. 6,959,313, filed Jul. 8, 2003, entitled "SNAPSHOTS OF FILE SYSTEMS IN DATA STORAGE SYSTEMS"; 11/147,739 filed Jun. 7, 2005, issued as U.S. Pat. No. 7,257,606, entitled "METHODS OF SNAPSHOT AND BLOCK MANAGEMENT IN DATA STORAGE SYSTEMS"; 11/407,491, filed Apr. 19, 2006, issued as U.S. Pat. No. 7,379,954, entitled "MANAGEMENT OF FILE SYSTEM SNAPSHOTS"; 11/879,230, filed Jul. 16, 2007, issued as U.S. Pat. No. 7,653,669, entitled "SNAPSHOTS OF FILE SYSTEMS IN DATA STORAGE SYSTEMS"; 12/154,494, filed May 23, 2008, issued as U.S. Pat. No. 7,756,844, entitled "METHODS OF DETERMINING AND SEARCHING FOR MODIFIED BLOCKS IN A FILE SYSTEM"; and 12/586,682, filed Sep. 25, 2009, issued as U.S. Pat. No. 7,836,029, entitled "SYSTEMS AND METHODS OF SEARCHING FOR AND DETERMINING MODIFIED BLOCKS IN A FILE SYSTEM" all of which are incorporated by reference for all purposes.

While snapshots can be used to view a file system as it exists or existed at a particular point in time, the snapshots are pointers to data blocks and do not include the actual contents of the data blocks themselves. If a file system becomes corrupt or the like, disaster recovery may involve accessing a non-corrupt version of data block contents. Accordingly, users may create one or more replicas of a file system, which include copies of the file system data. By copying the entire contents of a file system to a replica file system, the replica file system may also include various types of metadata and the like, including, for example, the file tree structure, space allocation information, etc. Still, the replicated file system's usefulness may depend on its accuracy. Accordingly, users may desire to verify the replicated file system after it is created to verify that the replicated data is accurate.

Typically, file systems are stored in an environment controlled by a file system service provider (referred to herein as "vendor"). The vendor's service may typically include guarantees to various end users, such as minimum allocations of storage, system availability, reliability, and security, etc. To provide these services, vendors typically give users file-level access to their file systems, but maintain control (e.g., limit or prevent access by consumers) at the block level. This allows users to perform standard file management functions (e.g., read, write, delete, directory management, etc.), while restricting users from performing block-level functions.

In this context, traditional techniques for verifying replicated file systems are offered at the user level and are based on file-level functions. The verification routine typically traverses the file tree (e.g., the directory structure) to create fingerprints (e.g., hash checksums) of each file of the source active file system and of each file of the target replicated file system. The fingerprints are then compared to detect any differences between the source and replicated files. These traditional verification techniques can be limited in various ways. One such limitation is that it typically takes an appreciable amount of time and system resources to traverse the file tree. File-based traversal tends to involve non-sequential disk access and other functions. This can be resource-intensive, particularly in file systems having complex trees or large numbers of small files, or in sparse file systems, etc. Another such limitation is that the file-level verification typically cannot be made aware of inaccurate space allocations unless each snapshot of the file system is independently verified. For example, the file path may not include an indication of which blocks are allocated to which snapshots. Iterating separately over each snapshot can involve considerable amounts of redundancy and other inefficiencies.

Embodiments described herein provide offline, block-level verification of replicated file systems. According to some embodiments, rather than traversing the file system at the file level according to the file tree, the verification traverses the file system sequentially at the block level. For example, rather than implementing the verification as a user process, the verification is performed by the vendor (or other entity having block-level permission). A signature is created for each of the source active file system and the target replicated file system. As described more fully below, each signature includes records of both block-level fingerprints and block-level space allocations.

Block-level traversal can provide a number of features. One such feature is that sequential disk access is typically appreciably more efficient than file-based disk access. This can allow the traversal to be faster, less resource intensive, etc. Another related feature is that the sequential, block-level access may remain relatively efficient, even in context of complex file trees, large numbers of small files, sparse file systems, and the like. Yet another feature is that the block-level traversal allows exploitation and/or verification of space allocation information. For example, the block-level traversal can provide information on which blocks are allocated to which snapshots (e.g., access to space map block allocations) and/or other information that may not be available as part of the file path (i.e., at the file level). Still another feature is that sequential, block-level traversal can effectively capture all data relating to all snapshots without separately traversing the file trees of those snapshots. This can allow for more verification of snapshot data without added redundancies.

Another feature is that block-level differences can sometimes be reconciled with knowledge of associated space allocation information. For example, the signatures are compared to discover any discrepancies between the source and target data. The discrepancies may indicate that the replicated file system is corrupt or otherwise invalid. In some cases, the discrepancies are due to inaccurate space allocations (e.g., where a snapshot was deleted from the replicated file system) or some other reason that may be reconcilable. Certain of these reconcilable reasons may be evident from the space allocation data obtained from the block-level traversal of the file system.

Turning first to FIG. 1, a block diagram is shown of an illustrative data storage system 100, including a number of hosts 110 coupled to one or more data storage subsystems 105. Each host 110 is a computer that can connect to clients, to data storage subsystems 105, and to each other. Each host 110 provides software and/or hardware interfaces, such as network interface cards and software drivers to implement Ethernet, Fibre Channel, ATM, SCSI, InfiniBand, and/or any other type of interface.

In one embodiment, a first host 110a includes a motherboard with a CPU-memory bus 114 that communicates with one or more processors 112 (e.g., dual processors). A processor 112 could be any suitable general-purpose processor running software, an ASIC dedicated to perform the operations described herein, a field programmable gate array (FPGA), etc. Also, one could implement embodiments using a single processor 112 in each host 110 or more than two processors 112 to meet more stringent performance requirements.

The first host 110a has cache memory 120 that includes a cache manager 113, a cache directory 115, and cache lines 116. The cache memory 120 is nonvolatile memory, volatile memory, or a combination of both. Nonvolatile memory protects data in the event of a power interruption or a host failure. Data includes user data, instructions, and metadata. Nonvolatile memory may be implemented with a battery that supplies power to the DRAM to make it nonvolatile memory when a conventional external power interrupt circuit detects a power interruption or with inherently nonvolatile semiconductor memory.

Each host 110 can include a bus adapter 122 between the CPU-memory bus 114 and an interface bus 124. Each host runs an operating system, such as Linux, UNIX, a Windows OS, or another suitable operating system. The first host 110a can communicate with the second host 110b through an interconnect 140, shown as connected to an adapter 125a to the interface bus 124. The PCI bus is one suitable interface bus 124, and the interconnect 140 may be any suitable known bus, SAN, LAN, or WAN technology, or the like. In one embodiment, the interconnect 140 is a dedicated Fibre Channel (FC) point-to-point link that connects to FC-PCI bus adapter 125 to provide fast point-to-point communication between the hosts 110.

In an alternative embodiment, the interconnect network 130 (e.g., a FC fabric) provides extra bandwidth for host-to-host communications. In this embodiment, link 128 and link 138 connect to the interconnect network 130, and the hosts 110 use link 128 and link 138 when available. FC standard software can set priority levels to ensure high priority peer-to-peer requests, but there can still be some arbitration overhead and latency in claiming ownership of the links. For example, if links 128 and 138 are busy transferring data when a write request arrives, that operation must complete before either link is free for arbitration.

If the interconnect 140 ever fails, communication between hosts 110 can be handled using the interconnect network 130. The interconnect network 130 can be implemented by interconnects used in data storage systems such as Fibre Channel, SCSI, InfiniBand, Ethernet, etc. Embodiments can use redundant communication between hosts 110 to ensure the data storage system 100 has high availability. As illustrated, the first host 110a can connect, or couple, to the first data storage subsystem 105a through the bus adapter 122, the interface bus 124, the adapter 125n, the link 128, the interconnection network 130, and the link 132. To connect to the second data storage subsystem 105b, the first host 110a can use the same I/O path, except the data passes through link 134. The second host 110b can use the same type of I/O path plus link 132 to communicate with the first data storage subsystem 105a or link 134 to communicate with the second data storage subsystem 105b.

As will be described more fully herein, operations are performed on blocks of the data storage subsystems 105. In some embodiments, the data storage subsystems 105 are implemented substantially as described in U.S. patent application Ser. No. 10/264,603, entitled, "SYSTEMS AND METHODS OF MULTIPLE ACCESS PATHS TO SINGLE PORTED STORAGE DEVICES," filed on Oct. 3, 2002, now abandoned and incorporated herein by reference. It is understood, however, that other storage device(s) or data storage subsystems 105 could be used in other embodiments.

Figure 2:
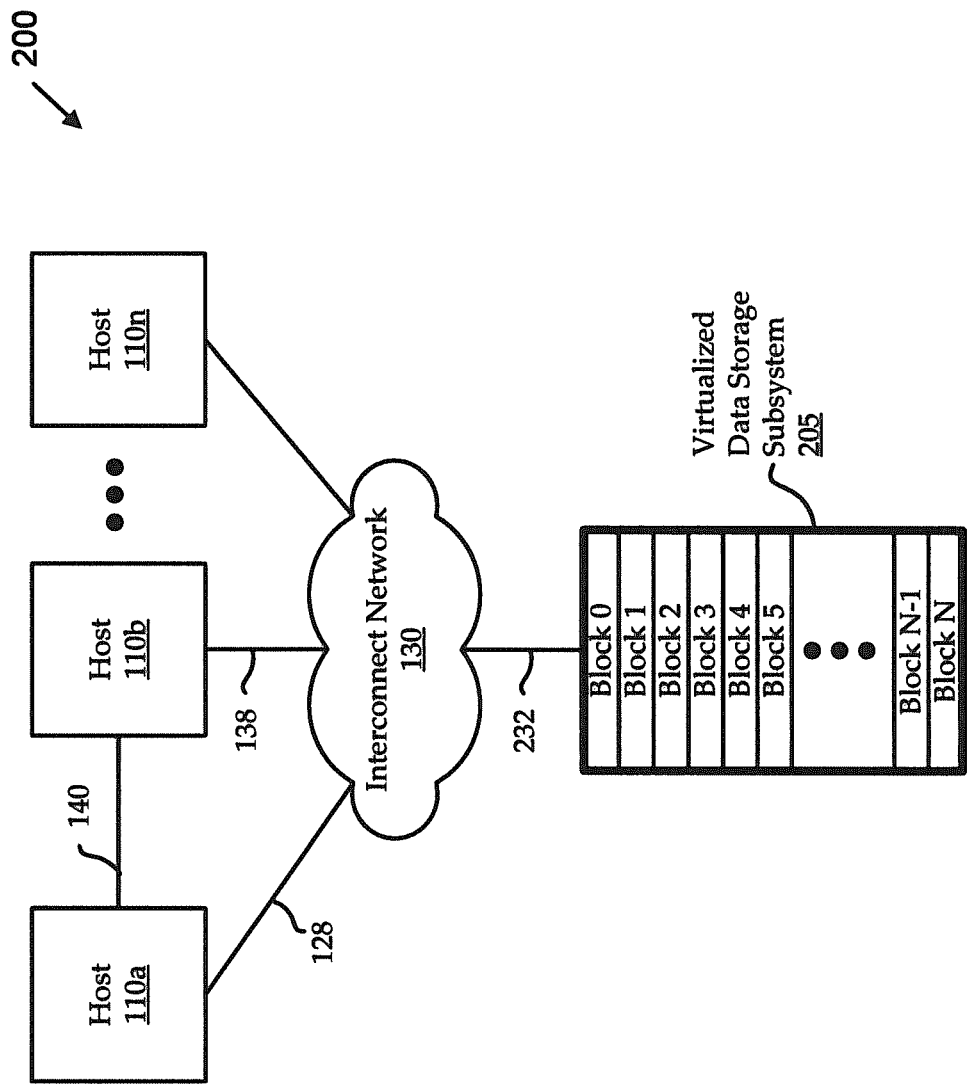
FIG. 2 shows a simplified block diagram of a portion of an illustrative data storage system, in which a number of hosts can access a virtualized data storage subsystem via an interconnect network.

FIG. 2 shows a simplified block diagram of a portion of an illustrative data storage system 200, like the one described with reference to FIG. 1, in which a number of hosts 110 can access a virtualized data storage subsystem 205 via an interconnect network 130. As illustrated in FIG. 1, the hosts 110 can communicate with each other and with one or more data storage subsystems 105 via the interconnect network 130. A file system may include blocks that span multiple data storage subsystems 105. Accordingly, when a host 110 accesses blocks of data in a file system, it may be accessing blocks across multiple data storage subsystems 105. For the sake of clarity, the blocks of the file system, whether physically in a single data storage system 105 or in multiple data storage systems 105, are shown as part of a single "virtualized" data storage subsystem 205.

For example, a first host 110a accesses data blocks from the virtualized data storage subsystem 205 via interconnect 128, interconnect network 130, and interconnect 232, while the second host 110b accesses data blocks from the virtualized data storage subsystem 205 via interconnect 138, interconnect network 130, and interconnect 232. Embodiments of interconnect 232 can include multiple interconnects between the interconnect network 130 and the multiple physical data storage subsystems 105. According to some embodiments, each storage device in the data storage subsystem is assigned a logical unit number (LUN) that is an identifier for the storage device. A virtual logical unit number (VLUN) is as an abstraction of the storage device(s) or the virtualization of the data storage subsystems such as a linear array of blocks as it appears to the data storage system users. In various embodiments, the implementation of a VLUN may be striped (i.e., spread) over multiple RAID groups for added performance, spread over sections of a RAID group for flexibility, or copied on multiple RAID groups for reliability. As shown, the storage devices of the data storage subsystem are virtualized as a file system employing contiguous fixed sized blocks 0-N where the size of each block is some value (e.g., between one and 64 kilobytes).

It will be appreciated that there may be a number of ways to arrange file system data within the virtualized data storage subsystem 205. For example, as will be described more fully below, the virtualized data storage subsystem 205 can be used to store one or more active file systems, read-only snapshots, and supporting data (e.g., metadata files, indices, etc.). Accordingly, the specific data arrangements described below are intended only to be illustrative of certain embodiments, and other arrangements may be used without departing from the scope of the invention.

Figure 3:
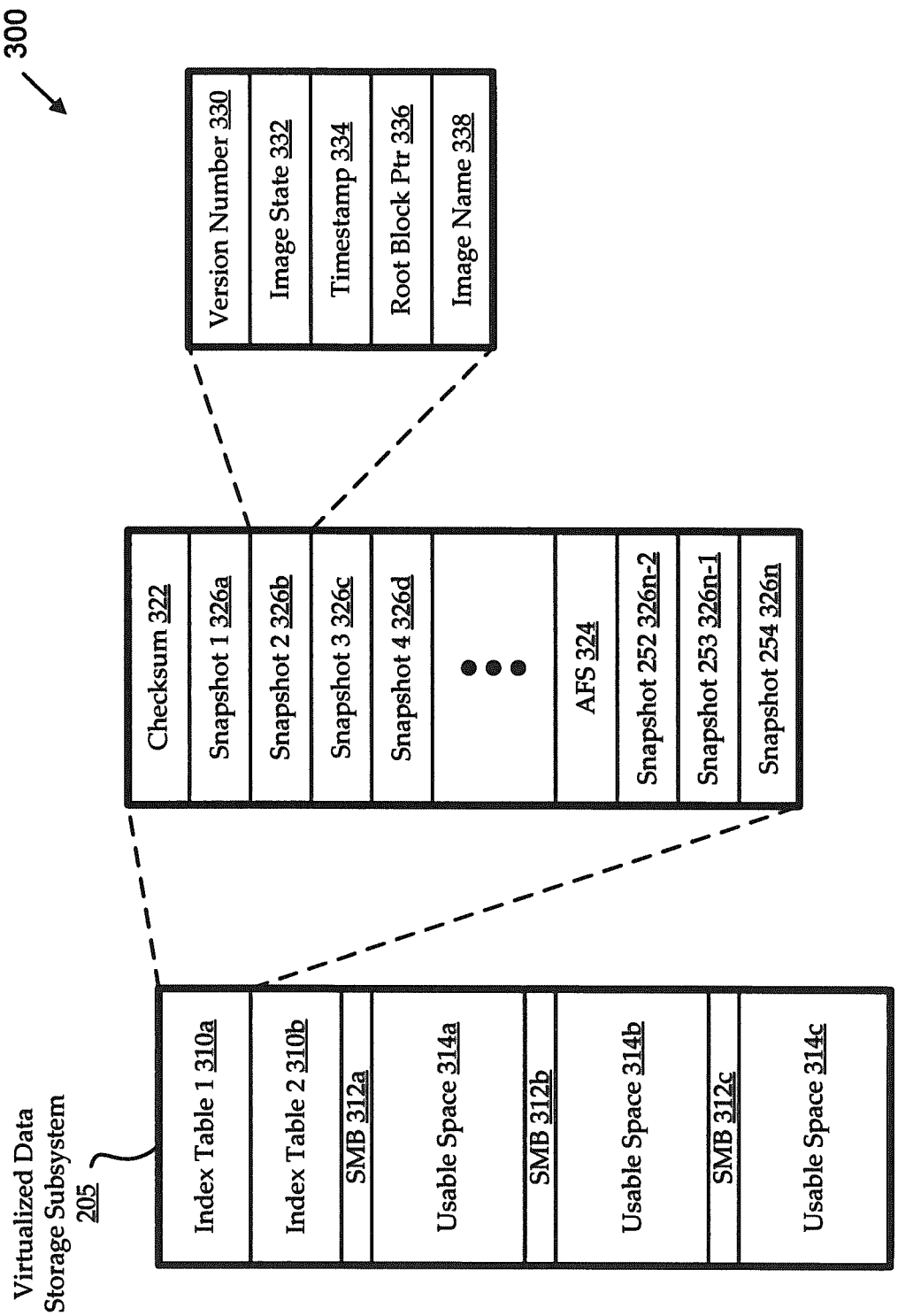
FIG. 3 shows various abstractions of an illustrative virtualized data storage subsystem, according to various embodiments.

FIG. 3 shows various abstractions of an illustrative virtualized data storage subsystem 205, according to various embodiments. The virtualized data storage subsystem 205 may act as a virtual logical unit number (VLUN), or the like. The virtualized data storage subsystem 205 can be used to maintain (e.g., allocate, read, write, de-allocate, etc.) blocks for index tables 310, space maps 312 ("space map blocks, or SMBs), and usable space 314 for data storage. Different implementations allocate different amounts of blocks to index tables 310, depending on the size of each block, the number of concurrent snapshot images supported, etc. For example, three 8-kilobyte blocks may be sufficient to support an index table of 254 snapshot images.

In some embodiments, as illustrated, the virtualized data storage subsystem 205 can include a pair of index tables 310 (e.g., six 8-kilobyte blocks) to allow the host (e.g., hosts 110 of FIG. 1) to alternate writes between the index tables 310 to ensure recovery in case of a data storage system failure. If the system fails during a write to one index table (e.g., 310a), the host can retrieve the unmodified copy of the other index table (e.g., 310b). Other embodiments use other techniques, such as write journaling, to protect against system failure during index table writes. The remainder of the storage can be allocated to space map blocks 312 and usable space 314 for data storage.

Each index table 310 can include data to verify data integrity. For example, some implementations use algorithmic data, such as a checksum 322, a cyclic redundancy check, or a digital signature. The index table 310 further provides an index to the snapshot images 326 and the one or more active file systems 324 (e.g., each entry in the index table 310 represents a snapshot image 326 or an active file system 324). In the illustrative implementation, three 8-kilobyte blocks are used to support an index range of 1-255.

In various embodiments, each snapshot image 326 and active file system 324 has one or more associated attributes. As illustrated, the attributes can include a version number 330, image state 332, timestamp 334, root block pointer 336, and/or image name 338. In some embodiments, when the data storage system (e.g., the host) takes a snapshot of an active file system 324, it assigns the snapshot image 326 (and any generated active file systems 324, as explained more fully below) a unique version number 330, such as a 32-bit unsigned integer that increases monotonically. Certain implementations do not reuse version numbers even as snapshot images 326 or active file systems 324 are deleted or made obsolete.

The image state 332 can be implemented in various ways. According to some embodiments, the image state 332 can be one of the following: "active," representing an active file system 324; "in-use snapshot," representing a snapshot image 326 that users can access; "free," representing an index available for use by a snapshot image 326 or active file system 324; "deleted snapshot," representing a snapshot image that has been deleted by a user, but for which references to its index in space map blocks 312 have not been removed by a cleaner process or thread; or "obsolete snapshot," representing a snapshot image 326 for which a user has reverted to an earlier snapshot image 326, and for which the cleaner process or thread has not yet removed its references from space map blocks 312.

Other attributes can be implemented in various ways. In some embodiments, the timestamp 334 indicates a time and date when the snapshot image 326 or active file system 324 was created. Embodiments of the root block pointer 336 provide the address of the root block in the hierarchical structure of the image (e.g., snapshot image 326). Embodiments of the image name 338 include a character string used to easily identify the image to users.

Figure 4:
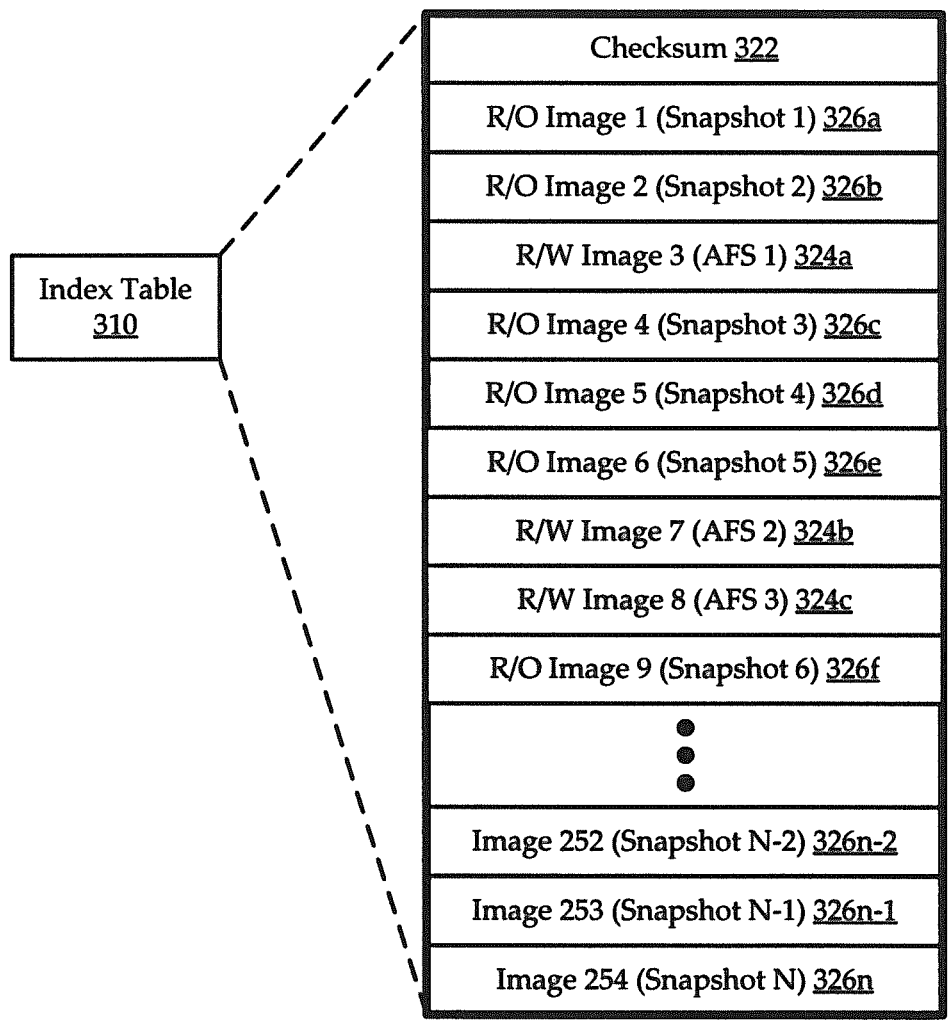
FIG. 4 shows an illustrative index table for use with multiple, concurrent active file system versions, according to various embodiments.

In some embodiments, writable snapshot functionality is provided to generate multiple active file system 324 versions. FIG. 4 shows an illustrative index table 310 for use with multiple, concurrent active file system 324 versions, according to various embodiments. The index table 310 provides an index to all the various images, including read-only ("R/O") images representing snapshot images 326 taken of one of the active file systems 324 at a particular time, and any concurrent versions of active file systems 324. For the sake of illustration, the index table 310 of FIG. 4 includes three active file systems 324 and a number of read-only snapshot images 326.

Figure 5A:
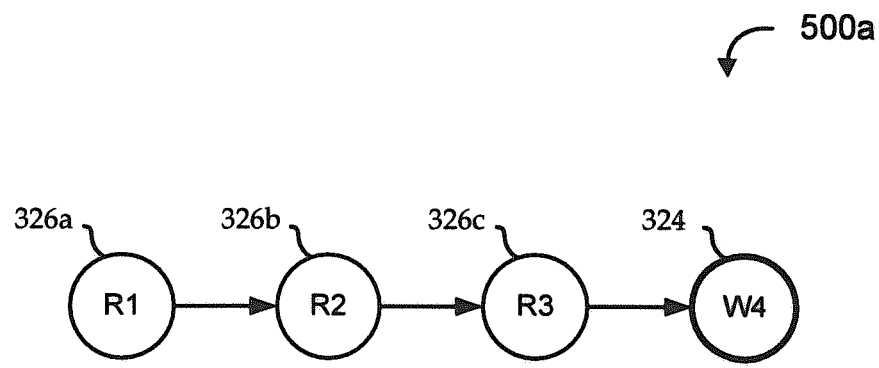
FIGS. 5A and 5B show tree structures of an illustrative read-only snapshot operation and an illustrative writable snapshot operation, respectively.
Figure 5B:
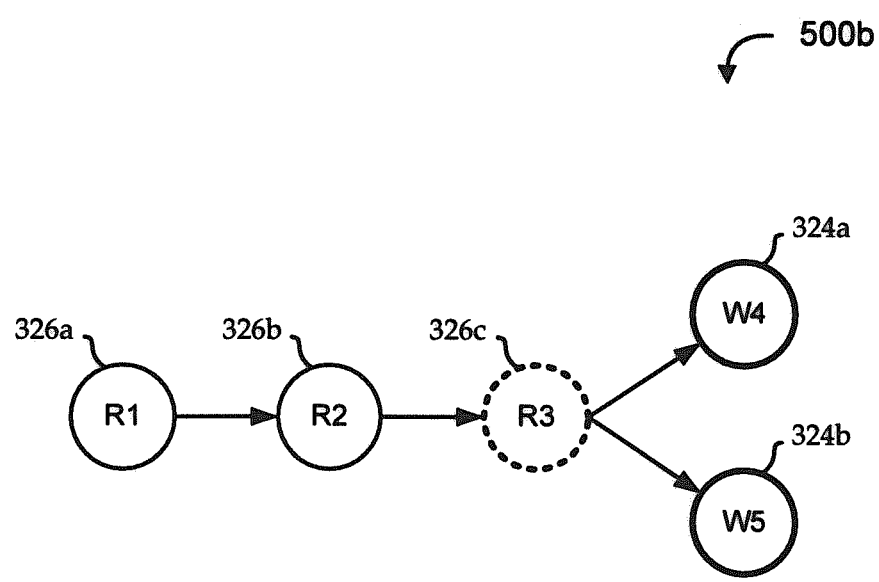

FIGS. 5A and 5B show tree structures 500 of an illustrative read-only snapshot operation and an illustrative writable snapshot operation, respectively. While a read-only snapshot will generate a read-only snapshot image 326 and a new active file system image 324 (a new version of the AFS that was used to take the snapshot), a writable snapshot will generate a read-only snapshot image 326 and two new active file system images 324 (two new and independent versions of the AFS that was used to take the snapshot).

FIG. 5A shows a case after three read-only snapshots have been taken of the active file system. In the illustrated case, the active file system is initially generated as W1 (e.g., a writable version of the active file system at index location "1" in an index table). A first read-only snapshot is taken, generating a read-only snapshot image 326a of W1 at index location "1" (indicated as "R1"), and generating a new version of the active file system at index location "2" (indicated as "W2"). Subsequently, a second read-only snapshot is taken of the active file system (now W2), resulting in "R2" and "W3"; and a third read-only snapshot is taken of the active file system (now W3), resulting in "R3" and "W4." The full tree (assuming no snapshot images 324 have been deleted) includes "R1," "R2," "R3," and "W4." It will be appreciated that this essentially mimics the traditional case of read-only snapshot functionality.

FIG. 5B shows a case after two read-only snapshots and a writable snapshot have been taken of the active file system. As in the case of FIG. 5A, the active file system is initially generated as W1; a first read-only snapshot is taken, generating a read-only snapshot image 326 ("R1") and a new version of the active file system ("W2"); and a second read-only snapshot is taken, generating a read-only snapshot image 326 ("R2") and a new version of the active file system ("W3"). Subsequently, a writable snapshot is taken of the active file system (now W3), which generates a read-only snapshot image 326 ("R3") and two new versions of the active file system ("W4" and "W5"). The full tree includes "R1," "R2," "R3," "W4," and "W5."

Notably, a result of the writable snapshot is that each of W4 and W5 is an independently writable version of the file system that tracks back to the same R3 node of the tree. Accordingly, R3 becomes an "inflection point," the implications of which will be described more fully below. It will be appreciated from the above that each node can have zero, one, or two children. An active file system 324 has zero children, a snapshot image 326 from a read-only snapshot operation has one child (e.g., an active file system 324 or another snapshot image 326), and a snapshot image 326 that was generated as an inflection point from a writable snapshot operation has two children (e.g., two active file systems 324, two snapshot images 326, or one of each). Some embodiments may allow a subsequent snapshot to be taken of a snapshot image 326 (i.e., rather than allowing snapshot operations only on active file systems 324).

It is worth noting that writable snapshots provide a number of features in addition to facilitating concurrent handling of multiple active file systems 324. One feature is that the additional active file systems 324 are each more efficient than a comparable "volume copy" or "clone." For example, using a pointer-based snapshot operation allows the new active file system to be created, even in a NAS-based architecture, in a very short time and using very small amounts of system resources. Another feature is that the writable snapshot operation involves substantially the same overhead to perform as the read-only snapshot operation. Yet another feature is that conventional file system operations (e.g., provisioning, backup, restore, replicate, etc.) are left substantially unchanged. Still another feature is that writable snapshot functionality can be naturally integrated with file system operations involving multiple storage pools (e.g., data progressive environments, auto-tiering, etc.). And another feature, as discussed above, is that snapshot images 326 and active file systems 324 generated from writable snapshots support traditional snapshot-related operations, like snapshot restore.

It is also worth noting that the ability to access multiple active file systems 324 concurrently allows for a number of use cases that are difficult or impossible to provide with read-only snapshot images 326 and a single active file system 324. Embodiments support independent network file system (NFS) exports and/or common internet file system (CIFS) shares for each active file system 324. Accordingly, developers can configure applications to point to a particular version of the file system. In this way, for example, multiple developers could concurrently use multiple active file systems 324 to develop or test different applications; one developer could concurrently test different versions of an application on different versions of the active file system 324, etc. In some embodiments, initial NFS exports and/or CIFS shares are copied (e.g., as a template) from a parent active file system 324 when a new version of an active file system 324 is generated. Notably, from the perspective of an administrator, each active file system 324 looks substantially like it would if there was only a single file system 324 (e.g., a single active file system 324 can be implemented as a degenerate case of the multiple active file systems 324). For example, each active file system 324 can be configured to share the same allocations, tiers, quality of service, slammer assignments, etc.

In some implementations, the various active file systems 324 are treated symmetrically, or in a substantially egalitarian fashion. For example, from the perspective of the virtualized data storage subsystem (e.g., the index table), the active file systems 324 may each be created in the same way, so that no particular active file system 324 is special with regard to form or function. Indeed, the active file systems 324 may still be treated differently from the perspective of the user. For example, though theoretically symmetric, the user may use one active file system 324 as the "production" file system, while the active other file systems 324 may be "development" or "test" environments. Alternative embodiments may be asymmetric or non-egalitarian. Techniques (e.g., code, metadata, etc.) may be used to maintain one active file system 324 as a primary or special file system. For example, it may be desirable to maintain a production database as a linear flat file to facilitate sequential querying. It will be appreciated that, if contents of the database change (e.g., files are added, removed, etc.) in only one active file system 324, that active file system 324 may only be able to maintain its linearity at the expense of the linearity of other active file systems 324.

Figure 6:
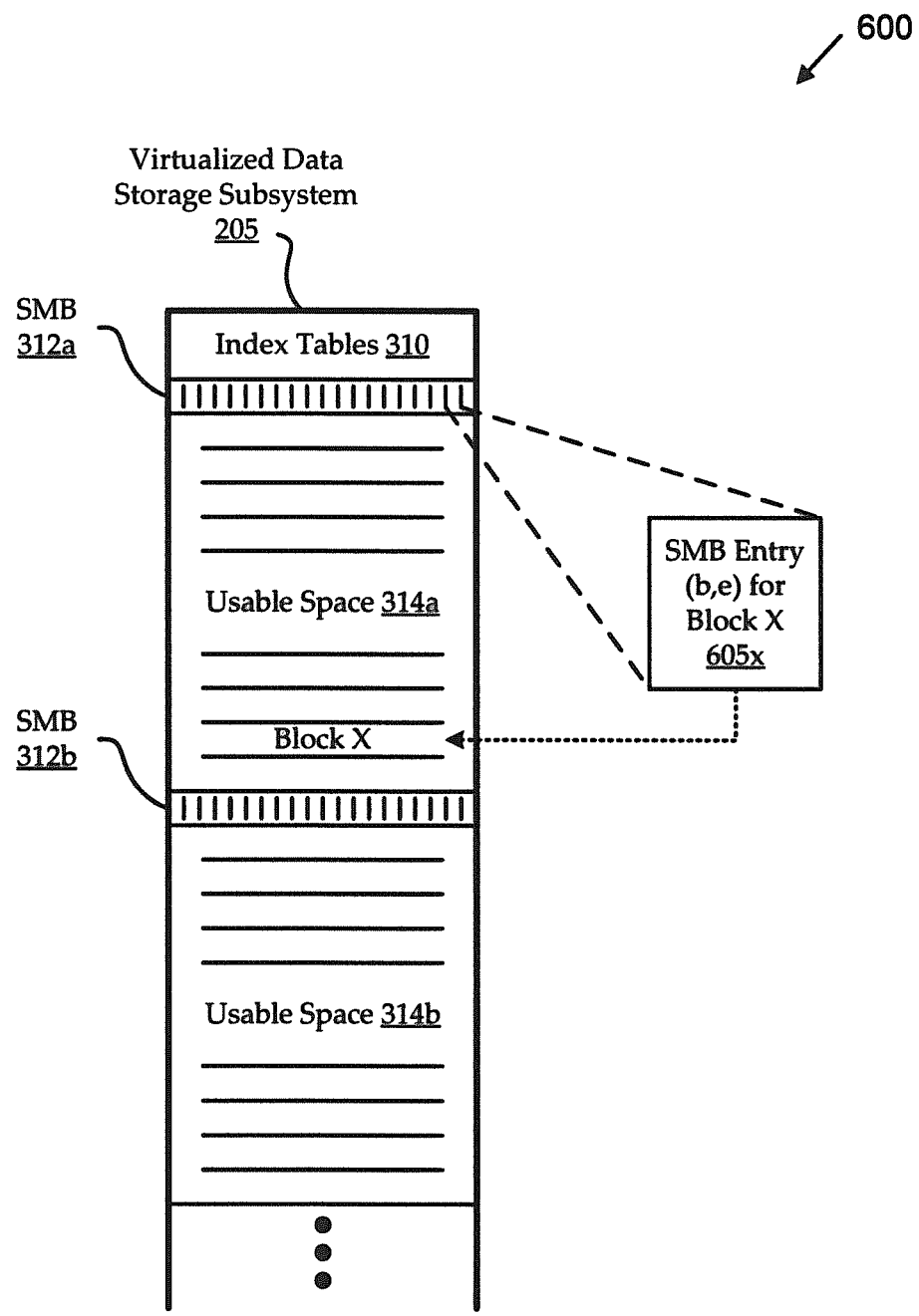
FIG. 6 shows an illustrative virtualized data storage subsystem with an illustrative data construct for space maps and usable space for data storage.

Referring back to FIG. 3, other than the blocks allocated for index tables 310, the remaining blocks of the virtualized data storage subsystem 205 are used for space maps 312 and usable space 314 for data storage. FIG. 6 shows an illustrative virtualized data storage subsystem 205 with an illustrative data construct for space maps 312 and usable space 314 for data storage. As illustrated, each space map block 312 keeps track of the blocks in its usable space 314 for data storage. For example, a space map block 312 can keep track of 2,047 blocks of usable space 314.

Embodiments of the space map blocks 312 contain pairs of indexes referred to herein as "space map block entries" 605. For example, each space map block entry 605 uses an 8-bit word to represent any of 254 snapshot images 326 or active file systems 324. The space map block 312 associates each of its set of usable space 314 blocks with a space map block entry 605 that is effectively an index into the index table 310. Each space map block entry 605 has a beginning value "b" that indicates the first image (e.g., snapshot image 326 or active file system 324) to refer to the usable space 314 block and an ending value "e" that indicates the last image to refer to the usable space 314 block. Thus, each space map block entry 605 "(b, e)" in the space map block 312 is used to track the usage of an associated block in the usable space 314.

As described above, the space map block entries 605 can indicate index numbers of images, which can be translated to version numbers via the index table 310. This allows the space map blocks 312 to remain relatively small. However, in alternate embodiments, each space map block entry 605 contains a pair of version numbers (e.g., 32-bit) that represent snapshot images 326 or an active file system 324. Thus, each version pair "(b, e)" in the space map block 312 would be used to track the usage of an associated block in the usable space 314 using the versions directly without the added level of abstraction provided by the indices.

In some embodiments, "0" is used to indicate a lack of any specific image reference. When "b" is "0," there is no earliest image (and, therefore, there should be no image at all) that is referring to the associated block; and when "e" is "0," there is no latest image that is referring to the associated block (i.e., at least one active file system 324 is still referring to the associated block, or a latest referring image has not yet been determined). When an earliest or latest image is determined to be referring to the associated block, "b" or "e" will indicate the index in the index table 310 (or version number) that points to the earliest or latest image, respectively. In a first example, a space map block entry 605 of "(0, 0)" indicates that the associated block is free to use by a snapshot image or the active file system (i.e., the block is not currently allocated). In a second example, a space map block entry 605 of "(12, 44)" indicates that the earliest image to refer to the associated block is whichever version is associated with index "12" (e.g., R12) in the index table 310, and the latest image to refer to the associated block is whichever version is associated with index "44" (e.g., R44) in the index table 310. In a third example, a space map block entry 605 of "(12, 0)" indicates that the earliest image to refer to the associated block is whichever version is associated with index "12" (e.g., R12 or W12) in the index table 310, and the associated block is either being referred to by at least one active file system 324 (and possibly one or more other snapshot images 326) or the latest image to refer to the associated block has not yet been determined. Notably, in a traditional snapshot environment, where only a single active file system 324 can exist, any space map block entry 605 of "(b, 0)" indicates that the block is in use by the active file system 324. However, when multiple active file systems can exist concurrently, a space map block entry 605 of "(b, 0)" is insufficient to indicate which one or more of the active file systems 324 is using the associated block.

It will be appreciated that snapshots, including writable and read-only snapshots can be handled using various techniques and can be used in conjunction with various functions. Embodiments of some of these techniques and functions are described with reference to U.S. patent application Ser. No. 13/280,141, filed on Oct. 24, 2011, titled "WRITABLE SNAPSHOTS," which is hereby incorporated by reference in its entirety.

Figure 7:
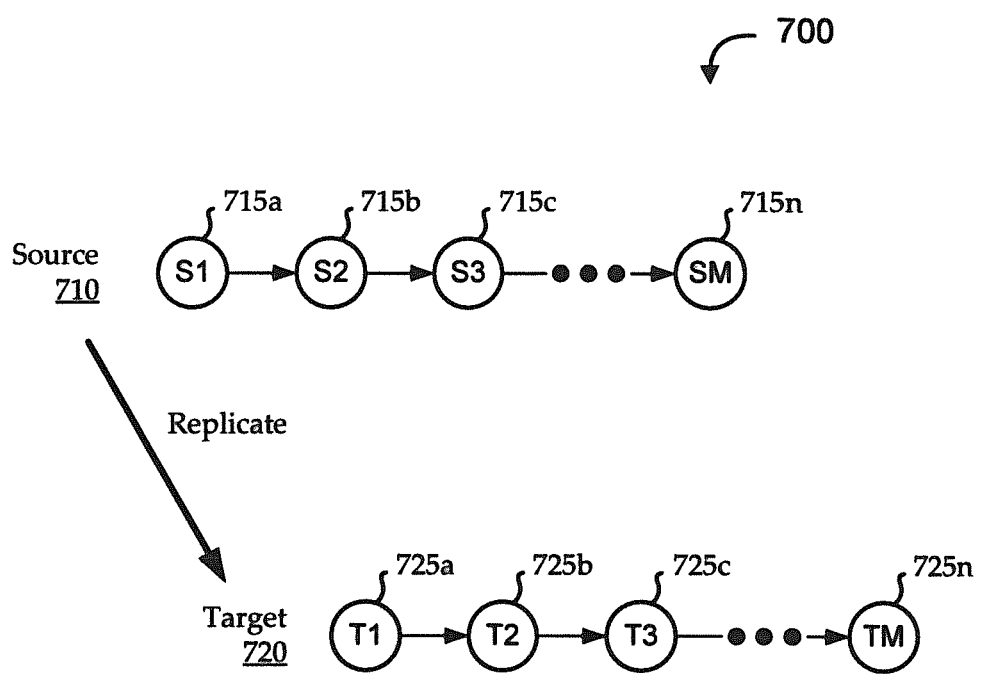
FIG. 7 shows a simplified representation of file system replication, according to various embodiments.

As discussed above, other functionality is provided using file system replication. FIG. 7 shows a simplified representation 700 of file system replication, according to various embodiments. The representation 700 includes a source file system 710 that has a number of snapshots 715. As described above, the snapshots 715 may be read-only snapshots, writable snapshots, etc. At least one of the snapshots 715 is an active file system.

Performing a replication function on the source file system 710 causes a target file system 720 to be generated. The target file system 720 is referred to as a "replicated file system," and may effectively be a volume copy of the source file system 710. As such, the target file system 720 includes replicated target snapshots 725 corresponding to each of the source snapshots 715. The replication function may cause additional information to be generated in some implementations. For example, as part of the replication, information may be generated to represent the replication status, identifiers of the file system, replication timestamps, and the like.

Some embodiments described herein provide functionality for verifying the accuracy of a replicated file system with reference to various diagrams and methods below. It will be appreciated that, in some embodiments, the methods are performed by systems, such as those described with reference to FIGS. 1 and 2. In alternative embodiments, other system configurations can be used. Further, though the methods are described serially below, the steps can be performed in parallel, for example, asynchronously or in a pipelined manner, or in different orders (except where otherwise indicated). Embodiments implement method steps using one or more computational devices (e.g., computers).

Figure 8:
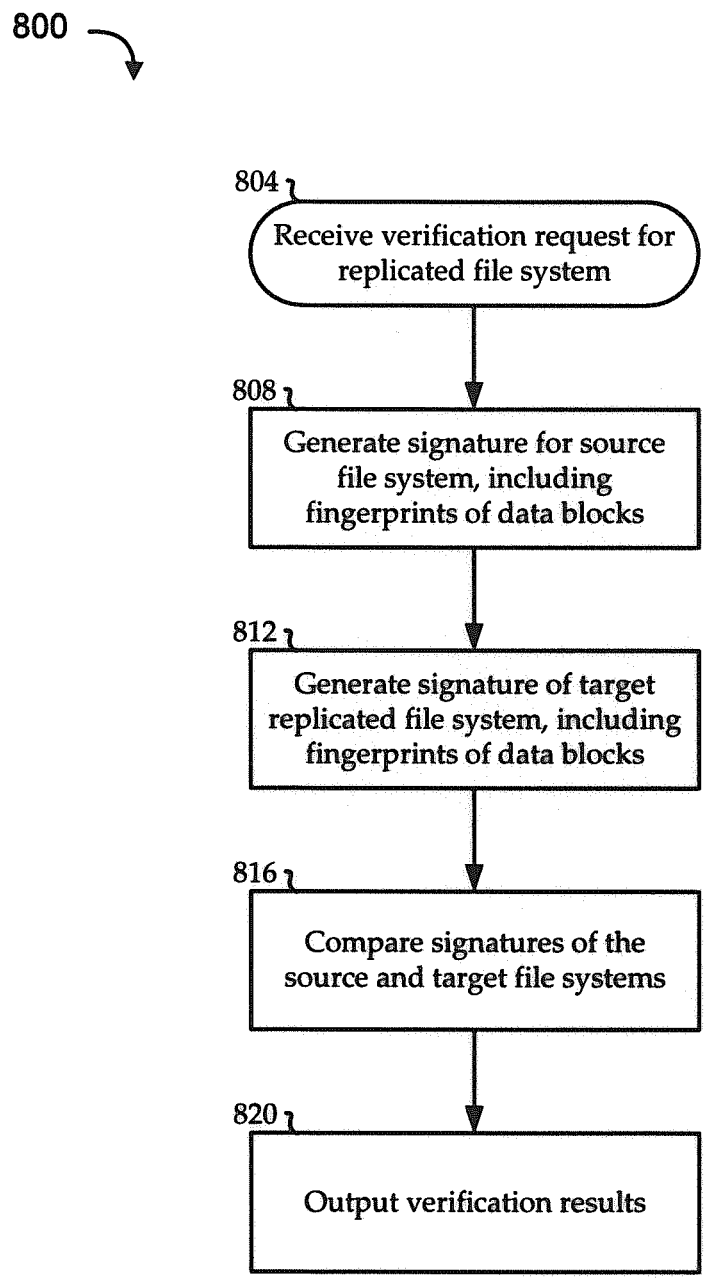
FIG. 8 shows a flow diagram of an illustrative method for verifying a replicated file system at the block level, according to various embodiments.

Turning to FIG. 8, a flow diagram is shown of an illustrative method 800 for verifying a replicated file system at the block level, according to various embodiments. The method 800 begins at stage 804 by receiving a verification request associated with a replicated file system. For example, a host operated by vendor receives a request from a user to verify a replicated file system being maintained on behalf of the user. As described above, the replicated file system was generated as the target of a replication function, where the source of the replication function was another file system.

At stage 808, a signature is generated for the source file system. As will be described further below, the signature includes fingerprints for data blocks of the source file system and/or additional information. For example, the signature may include information relating to space allocations, snapshots, timestamps, etc. At stage 812, a signature is generated for the target replicated file system. Again, the signature includes fingerprints for data blocks of the target replicated file system and/or additional information. For example, the signature may include information relating to source and file system identity, snapshots included in the replication, checkpoint information for synchronizing replication in the event of an interruption or failure, etc.

At stage 816, the signatures of the source file system and the target replicated file system are compared. For example, data block fingerprints are compared to determine whether any inconsistencies are present between the source and target file systems. Additionally, other information may be evaluated as part of the comparison at stage 816 to facilitate the comparison process, to identify additional discrepancies, to identify reconciliation opportunities, and/or for other reasons. At stage 820, results of the verification can be output in one or more ways. For example, a verification log can be generated, which may include any useful information. In some implementations, the verification log simply states whether or not the verification was successful. In other implementations, the verification log indicates what discrepancies were identified, any reconciliation measures that were taken, etc.

Figure 9:
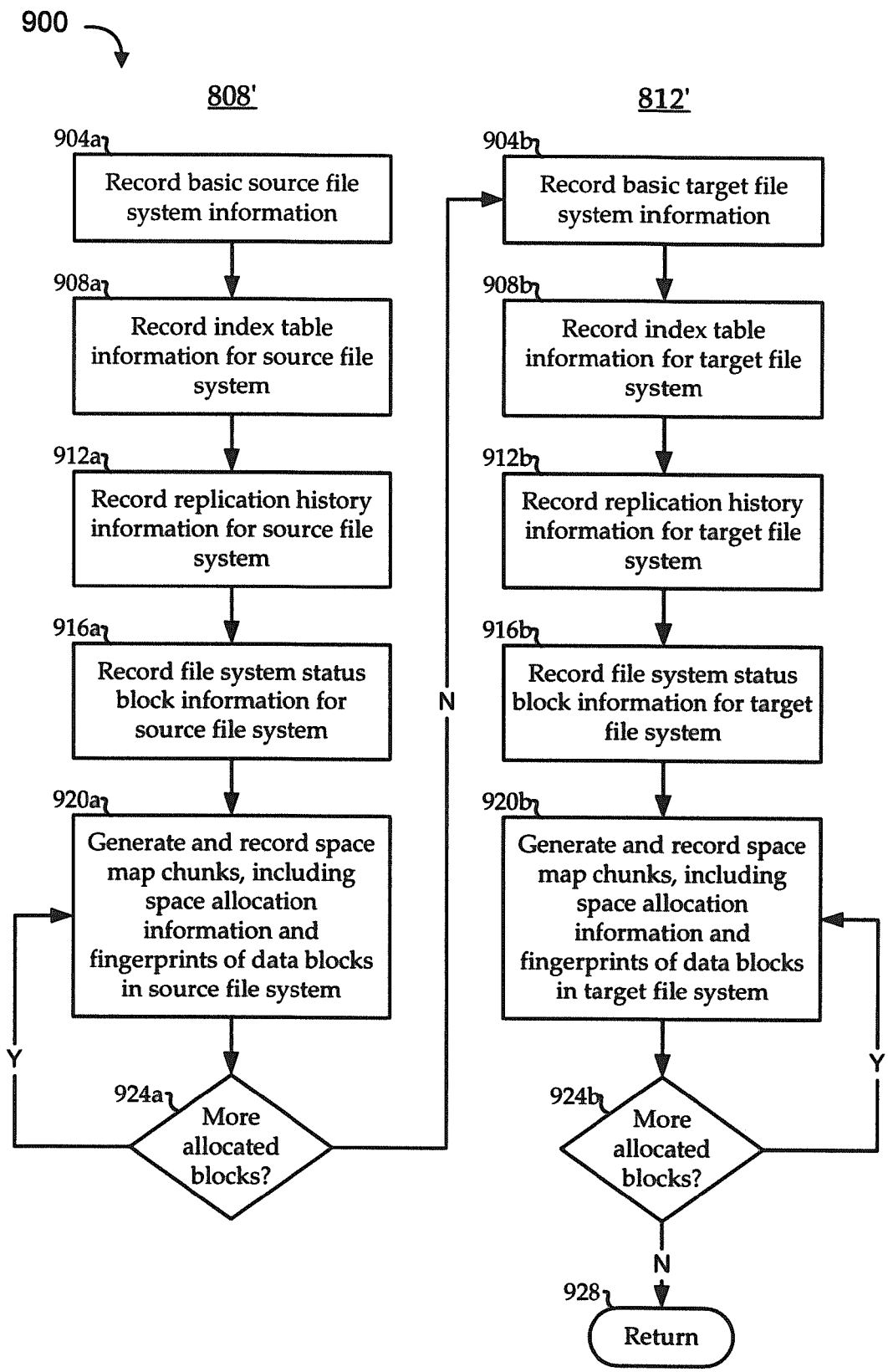
FIG. 9 shows a flow diagram of an illustrative method for generating signatures of source and target replicated file systems, according to various embodiments.

FIG. 9 shows a flow diagram of an illustrative method 900 for generating signatures of source and target replicated file systems, according to various embodiments. As illustrated, stages 904a-924a can be considered an illustrative implementation of stage 808 of FIG. 8, and stages 904b-924b can be considered an illustrative implementation of stage 812 of FIG. 8. Beginning at stage 904a, the method 900 records basic file system information for the source file system. The basic file system information may include, for example, an identifier of the storage system, a name of the file system, and internal identity of the file system, storage system version information, a time at which the signature is being taken, etc.

At stage 908a, index table information is recorded for the source file system. The index table information for the file system may be or may include information from the index table 310 described above with reference to FIGS. 3 and 4. For example the index table information may include checksums, snapshot data, data relating to the active file system or systems, etc. At stage 912a, replication history information may be recorded for the source file system. The replication history information contains replication configuration information for the file system. For example, the replication history information can include a source and target file system identifier, source and target storage system identifiers, a table of snapshots established by the replication, checkpoint information (e.g., for resuming a replication sync that was interrupted by a communication link or storage system failure), a designation of the file system as a source or target file system, a state of replication between the source and target file systems (e.g., established, broken, reversed, etc.) etc. At stage 916a, file system status block information is recorded for the source file system. Embodiments of the file system status block information include information about any corruptions found, a replication status (e.g., a last synchronized snapshot identifier), a replication synchronization status, and any snapshot information.

At stage 920a, space map chunks are generated and recorded. The space map chunks include space allocation information and fingerprints of data blocks in the storage file system. In some embodiments, the space allocation information includes one or more space map block entries, for example, as described above (e.g., indicating a starting and ending snapshot allocation for a particular data block). The space map chunks also include the fingerprints of data blocks generated as, for example, a hash function, a checksum, and/or according to any other suitable cryptographic function and/or related technique. Each fingerprint can be generated according to various "strengths" and/or sizes. For example, each fingerprint may be 16 bytes, 32 bytes, etc.

In one illustrative file system implementation, space map blocks are allocated four at a time, and each space map block includes a four kilobyte block that indicates 1,920 space map block entries (e.g., (b, e) entries). For example, a first set of blocks is stored at blocks 1024, 1025, 1026, and 1027. The space map block at block 1024 describes allocations beginning with data block 1028 and ending at block 2947 (i.e., block 2947 is the 1,920th data block after data block 1028). Similarly, the space map block at block 1025 describes allocations beginning with data block 2948 and ending with block 4867; the space map block at block 1026 describes allocations beginning with data block 4868 and ending with block 6787; and the space map block at block 1027 describes allocations beginning with data block 6788 and ending with block 8707. Accordingly, space map blocks 1024-1027 can indicate allocations for data blocks 1028-8707.

As described above, the space map chunks are generated at stage 920a by traversing the file system disk in a substantially sequential manner (e.g., sequentially, skip-sequentially, or the like). Each space map chunk can be considered a set of space allocations of a space map block followed by fingerprints of the data blocks referred to by the space map block. Using the illustrative example above, block 1024 is reached by the verification method 900. The set of space allocations provided by the space map block at block 1024 is recorded for data blocks 1028-2947. Fingerprints are then generated and recorded for each of those data blocks, for example, each fingerprint being a 16-byte hash checksum. Accordingly, the space map chunk may include the four kilobyte space map block followed by the 1,920 16-byte hash checksums.

It will be appreciated that the sequential traversal of the file system disk can provide a number of features. One such feature is that the sequential traversal allows a fingerprint to be recorded of each data block to efficiently preserve the contents of those blocks. Another such feature is that the sequential traversal provides efficient disk access, particularly in comparison to non-sequential (e.g. random access, file-based access) of the disk. Yet another such feature is that the sequential traversal allows the space allocations of the data blocks to be preserved. For example, one pass through the blocks of the file system provides a record of the entire set of allocations for all data blocks to all read-only snapshots, writable snapshots, and active file systems.

As illustrated, embodiments of the method 900 make a determination at stage 924a as to whether any blocks remain in the source file system for which a space map chunk should be generated and recorded. For example, in the illustrative example above, a space map chunk is generated and recorded for space map block 1024 and its respective data blocks. Subsequently, space map chunks are similarly generated and recorded for each of space map block 1025 and its respective data blocks, space map block 1026 and its respective data blocks, and space map block 1027 and its respective data blocks, thereby recording information for blocks 1024-8707 of the source file system. Another space map block may be identified at block 8708 of the source file system, and the method 900 may proceed accordingly until all blocks of the source file system are accounted for.

In order to perform the verification, another signature is generated for the target replicated file system. In some embodiments, the signature is generated for the target replicated file system after the signature generation for the source file system is complete. In other embodiments, the signatures of the source and target replicated file systems are generated wholly or partially in parallel. For example, the source and target replicated file systems may be stored on different volumes, and parallel processes can be used to efficiently generate the signatures in a substantially concurrent manner.

Embodiments of the signature generation for the target replicated file system may be performed in substantially the same manner as the signature is generated for the source file system. Accordingly, similar stages of each signature generation process are labeled using similar reference numerals. As with generation of the signature for the source file system, generation of the signature for the target replicated file system may begin at stage 904*b*, the method 900 records basic file system information for the target replicated file system. At stage 908*b*, index table information is recorded for the target replicated file system. At stage 912*b*, replication history information may be recorded for the target replicated file system. At stage 916*b*, file system status block information is recorded for the target replicated file system. At stage 920*b*, space map chunks are generated and recorded for all space map blocks and data blocks of the target replicated file system. Space map chunks may continue to be generated until no blocks remain to be accounted for, as indicated by the determination made at stage 924*b*. When the signatures of both the source and target file systems have been generated, the method 900 may end. For example, the method 900 may be a portion of a higher-level verification process (e.g., the method 800 of FIG. 8), and may return to that process as indicated by stage 928.

It will be appreciated that the types of information collected as part of the signature according to the method 900 represents only one set of embodiments. Other implementations can record some or all of this information depending, for example, on the types of checks desired as part of the verification process. For the sake of illustration, different types of information in the signatures can be treated in different ways. In some embodiments the information recorded in blocks 904*a*-916*a* is considered "additional" information (i.e., in addition to the space map chunk information). Some are all of the additional information can be used to various extents and/or in various ways to aid in the verification process. For example, some implementations do not compare the full replication history information (recorded as part of stage 912), though replication history blocks are checked to make sure they have proper checksums. A lack of a proper checksum can be an indication of data corruption. On the contrary, some implementations use specific data from the file system status blocks (recorded as part of stage 916). For example, file system status data can be used to determine a last synced snapshot, whether the file system considers itself to be a replication target, etc. Further, various embodiments can collect some or all of the information described above, and/or additional information, in series or in parallel.

Figure 10:
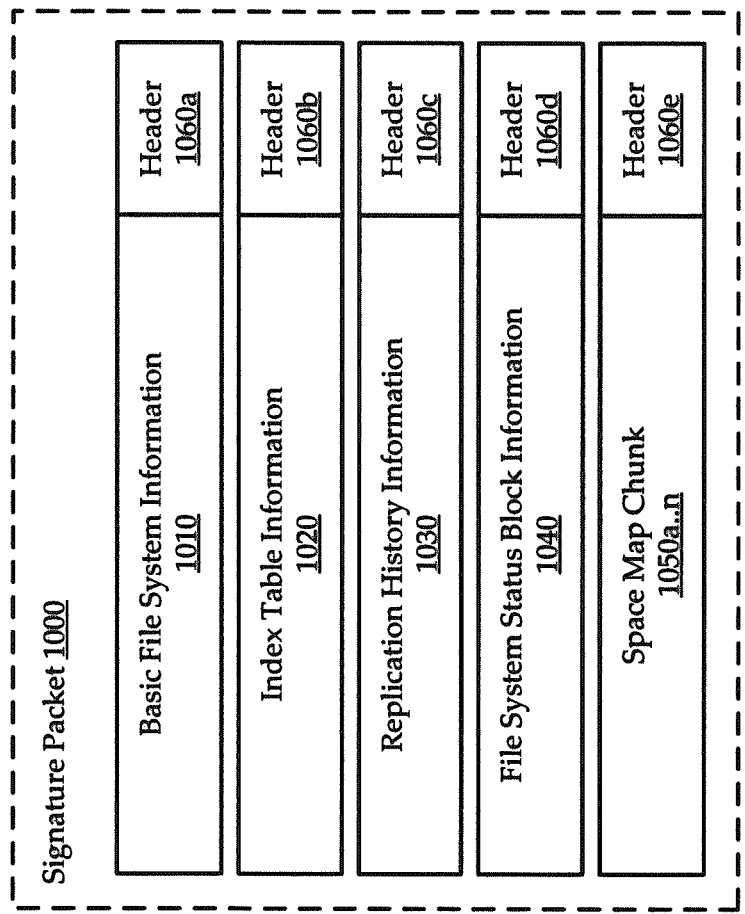
FIG. 10 shows an illustrative signature packet, according to various embodiments.

According to some implementations, each signature may be generated substantially as a packet of information that can be communicated among various system components, as desired. FIG. 10 shows an illustrative signature packet 1000, according to various embodiments. As illustrated, the signature packet 1000 includes blocks of information corresponding to the information recorded in the method 900 of FIG. 9. For example, the signature packet 1000 includes basic file system information 1010, index table information 1020, replication history information 1030, file system status block information 1040, and space map chunk information 1050.

In some embodiments, the signature packet 1000 includes one or more headers 1060. For example, in some implementations, each type of information is designated within the signature packet 1000 according to its header 1060. Each header 1060 can be a standard or non-standard type of header, for example according to a standard protocol. In some implementations, the header 1060 includes data (e.g., a "magic number," checksum, etc.) used for verification, a length of the record, a type of the record, a block number pertaining to the record for space map chunk data, and/or any other useful information.

It is worth noting that typically, the space map chunk information 1050 forms the vast majority of the signature packet 1000. The additional types of information that may be collected as part of generating the signature packet 1000 do not generally add an appreciable amount of overhead to the amount of space consumed by the signature packet 1000. In one illustrative implementation, data is stored in 512-kilobyte data blocks and 16-byte hash checksums are used for the fingerprints. In this type of implementation, the signature packet 1000 representing a file system may be approximately thirty-two times smaller than the file system itself.

Figure 11:
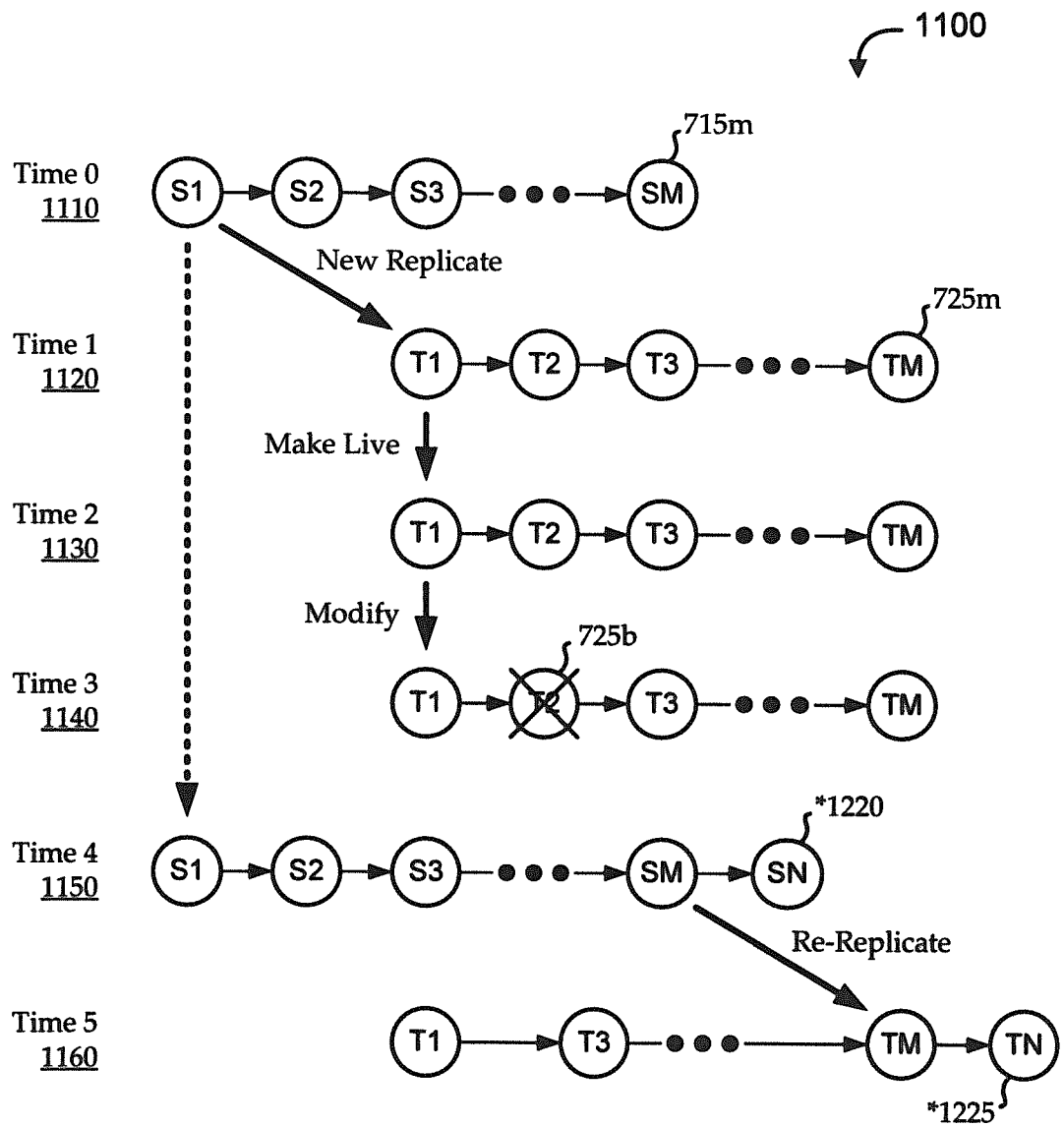
FIG. 11 shows a simplified diagram of a data replication environment over time to illustrate certain functionality.

FIG. 11 shows a simplified diagram 1100 of a data replication environment over time to illustrate certain functionality. The diagram 1100 begins at "Time 0" 1110 with an illustrative source file system, like the source file system 710 described above with reference to FIG. 7. The file system includes a number of snapshots 1205 indicated as ranging from snapshot "S1" to snapshot "SM". At "Time 1" 1120, the source file system is replicated for a first time. After the replication, the target replicated file system includes the same data allocated in the same way (e.g., according to the same snapshots) as in the source file system. The target replicated file system may look like the target replicated file system 720 described above with reference to FIG. 7.

Some embodiments provide functionality to turn a replicated file system into an active file system. This functionality may be referred to as making the file system "live." When the replicated file system is a live (e.g., active) file system, various functions can be performed on the file system, such as deleting snapshots. At "Time 2" 1130, the target replicated file system is made live; and at "Time 3" 1140, the live target replicated file system is modified by deleting snapshot "T2" 725*b*.

At some later time, indicated as "Time 4" 1150, the source file system has been modified so that an additional snapshot "SN" 715*n* is part of the source file system. At "Time 5" 1160, the file system is replicated once again. In some implementations, rather than doing a complete volume copy, the re-replication replicates from the last, previously synchronized snapshot forward. In the illustrative scenario of FIG. 11, the last, previously synchronized snapshot is snapshot "SM" 715*m*. Accordingly, re-replication at "Time 5" 1160 involves replication of snapshot "SM" 715*m* and new snapshot "SN" 715*n*.

Notably, re-replication of the source file system does not reintroduce snapshot "S2", which was deleted from the target replicated file system at "Time 3" 1140. Accordingly, even if the file system data has been accurately replicated, there is a discrepancy in the file system space allocation information. Suppose, for example, that a space map block entry for a data block of the source file system indicates that the data block is allocated between snapshots "S2" and "SM" as of "Time 0" 1110. At "Time 1" 1120, after the first replication, the target replicated file system includes a corresponding space map block entry for a corresponding data block of the target replicated file system indicating that the data block is allocated between snapshots "T2" and "TM". After the target replicated file system is modified at "Time 3" 1140, the space map block entry may be updated to reflect that the data block of the target replicated file system is now allocated for snapshots "T3" to "TM". After the re-replication, the source file system space map block entry may indicate that the data block is allocated for snapshots "S2" to "SN", while the corresponding target replicated file system space map block entry may indicate that the data block is allocated for snapshots "T3 to "TN". Comparing these entries as part of the verification process would, therefore, indicate a discrepancy between the space allocation information for the two file systems. Still, however, it may be desirable to allow this type of discrepancy and to verify the replica as valid, accordingly.

Figure 12:
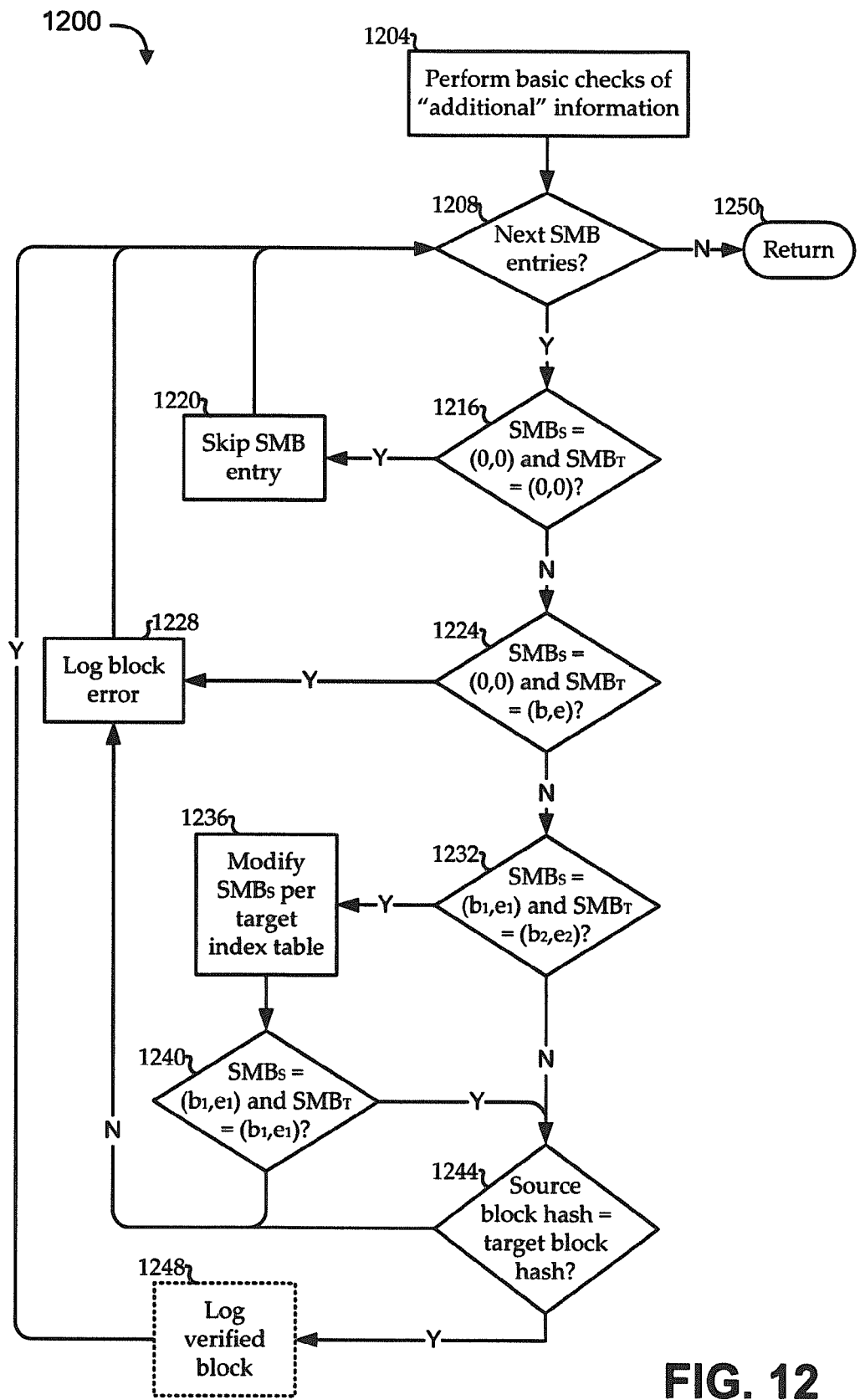
FIG. 12 shows a block diagram of an illustrative method for comparing the signatures of source and target replicated file systems, according to various embodiments.

FIG. 12 shows a block diagram of an illustrative method 1200 for comparing the signatures of source and target replicated file systems, according to various embodiments. The method 1200 of FIG. 12 may be an embodiment of stage 816 of FIG. 8. It will be appreciated that the signatures of the source and target replicated file systems can be compared in a number of different ways to provide various types of information. For example, numerous steps may be performed prior to comparing the space map chunk information of the signature packets. As illustrated by stage 1204, embodiments of the method 1200 begin with basic checks on the two signature files. These checks can include, for example, verifying that the file system represented as a source file system serves that role, verifying that the file system represented as a target replicated file system serves that role, verifying that the target replicated file system is synchronized to a valid snapshot, verifying that the target has only snapshots that are present on the source (e.g., even if snapshots have been deleted from the target replicated file system, verifying that no snapshots have been added to the target replicated file system that are not also present on the source file system), verifying that the snapshots of the target replicated file system that are in common with those of the source file system have the same timestamp and version numbers, verifying that the replication history blocks have correct checksums, etc.

After performing the basic checks at stage 1204, the method 1200 may iterate through the space map chunk information of the two signature files. Various stages of the method 1200 attempt to verify whether space allocation information is correct for each block in the target replicated file system. As discussed with reference to FIG. 11, this verification may take into account allocation information of the source file system for the corresponding data block, as well as valid differences in the set of snapshots that the target replicated file system contains.

At stage 1208, a determination is made as to whether any space map block entries remain to be verified. For example, as described above, each space map chunk includes a number of space map block entries, and each space map block entry of the target replicated file system should have a corresponding space map block entry in the source file system. Accordingly, embodiments iterate through stages 1208-1248 for all the space map block entries of the signature files until no space map block entries remain to be verified.

At stage 1216, a determination is made as to whether a source space map block entry in the corresponding target space map block entry both indicate that the corresponding data block is not allocated. For example, this may be indicated by having a space map block entry of "(0,0)". If both the source and target replicated file systems indicate that the block is not allocated, the entry may be effectively skipped (i.e., further processing or analysis of the entry is not performed) at stage 1120, and the method 1200 can continue with a next space map block entry if one exists.

If it is determined at stage 1216 that one or both space map block entries indicates something other than that the respective data block is not allocated, a further determination may be made at stage 1224 as to whether the source space map block entry indicates that the data block is not allocated while the target space map block entry indicates that the data block is allocated. For example, the source space map block entry may be "(0,0)", and the target space map block entry may be "(b,e)". This type of discrepancy may indicate that the target file system thinks that a particular data block is allocated when that data block is not allocated according to the source file system. Accordingly, the discrepancy may be logged at stage 1228, and the method 1200 may proceed with the next space map block entries if any exist.

If it is determined at stage 1224 that the source space map block entry indicates something other than that the respective data block is not allocated, a further determination may be made at stage 1232 as to whether both the source and target space map block entries indicate that the respective data block is allocated, though to different sets of snapshots. For example, as illustrated, the source space map block entry may indicate that the data block is allocated to a first set of snapshots "$(b_1,e_1)$", while the target space map block entry may indicate that the data block is allocated to a second set of snapshots "$(b_2,e_2)$". Notably, the difference in space allocation may be in the respective "b" values, the respective "e" values, or in both the "b" and "e" values.

In some scenarios, a discrepancy in the space allocations indicated by the source and target space map block entries can indicate a corrupt and/or otherwise inaccurate replicated file system. In other scenarios, as described above with reference to FIG. 11, the target file system can validly include a different set of snapshots from that of the source file system. In these other scenarios, it may be desirable to verify the accuracy of the replicated file system even in context of the detected discrepancy in the space allocations. To determine whether the discrepancy in space allocations is of an allowed type, embodiments attempt to reconcile the space allocations.

At stage 1236, the space map block entries are modified according to index table information for the target replicated file system. For example, the index table information can be used to determine whether a particular snapshot or snapshots were deleted from the target replicated file system. For the sake of illustration, according to the scenario illustrated in FIG. 11, a second snapshot of the target replicated file system ("T2") corresponding to a second snapshot of the source file system ("S2") is deleted prior to re-replication. After re-replication, a particular source file system space map block entry may indicate that a respective data block is allocated for snapshots "S2" to "SN", while the corresponding target replicated file system space map block entry may indicate that the data block is allocated for snapshots "T3 to "TN". However, during the verification process, for example at stage 1236, the source space map block entries in the signature file could be modified so that any "b" values of "S2" are changed to "S3" (i.e., the source index corresponding to the next valid snapshot index for the target replicated file system), and any "e" values of "S2" are changed to "S1" (i.e., the source index corresponding to the previous valid snapshot index for the target replicated file system). After this modification, the particular source file system space map block entry may indicate in the signature file that the respective data block is allocated for snapshots "S3" to "SN". This allocation would correspond to the allocation in the target replicated file system signature file of snapshots "T3" to "TN", and may be considered verified.

After the modification is performed at stage 1236, a further determination is made at stage 1240 as to whether the space allocations indicated by the source and target space map block entries are now the same. If the space allocations still appear to be different even after the modification, this may likely indicate an inaccurate or otherwise corrupted target replicated file system. Accordingly, the discrepancy may be logged at stage 1228, and the method 1200 may proceed with the next space map block entries if any exist.

If, after the modification at stage 1236, it is determined at stage 1240 that the space allocations are now the same according to both the source and target space map block entries, the method 1200 may continue at stage 1244. At stage 1244, the fingerprints of the data blocks corresponding to the space map block entries are compared. The fingerprints are generated in such a way that a match between the fingerprints indicates a high likelihood (e.g., a substantial certainty) that the data in the corresponding file system data blocks similarly matches.

It will be appreciated from the above that the method 1200 reaches stage 1244 for a particular set of space map block entries when the space allocation information for the corresponding data block has effectively been verified (e.g., a discrepancy has not been found). As such, a positive match at stage 1244 may be considered full verification of replication of the data block, including both its contents and space allocation information. Accordingly, if a match is found at stage 1244, embodiments may proceed with the next space map block entries if any exist. In some embodiments, the verified information is logged at stage 1248 when a match is found at stage 1244. A determination at stage 1244 that the contents of the respective data blocks do not match may indicate that the target replicated file system is inaccurate or otherwise corrupt. Accordingly, the discrepancy may be logged at stage 1228, and the method 1200 may proceed with the next space map block entries if any exist.

As described above, when each space map block entry has been analyzed, the method 1200 may return to stage 1208 to analyze the next space map block entries if any exist. When it is ultimately determined at stage 1208 that there are no remaining space map block entries to analyze, the method 1200 may end at stage 1250. For example, at stage 1250, the method 1200 may end by returning to a higher-level process (e.g., the verification method 800 of FIG. 8).

It is worth noting that, in a correctly synchronized replica, none of the verification checks discussed above should fail. For example, all of the basic preliminary checks should be successful, all the space allocation information should match or be reconcilable, and all the data block fingerprints should match. If any of these verification checks fails, diagnostic information can be reported. For example, information can be logged to identify the information. In some implementations, one or more automated processes can attempt to address any failures, where possible. In some embodiments, in the event that the replicated file system is determined to be inaccurate or otherwise corrupt, the file system can be replicated anew, re-replicated, synchronized to the source file system (e.g., using a differential comparison tool), etc.

The various operations of methods described above may be performed by any suitable means capable of performing the corresponding functions. The means may include various hardware and/or software component(s) and/or module(s), including, but not limited to a circuit, an application specific integrated circuit (ASIC), or processor.

The various illustrative logical blocks, modules, and circuits described may be implemented or performed with a general purpose processor, a digital signal processor (DSP), an ASIC, a field programmable gate array signal (FPGA), or other programmable logic device (PLD), discrete gate, or transistor logic, discrete hardware components, or any combination thereof designed to perform the functions described herein. A general purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure, may be embodied directly in hardware, in a software module executed by a processor, or in a combination of the two. A software module may reside in any form of tangible storage medium. Some examples of storage media that may be used include random access memory (RAM), read only memory (ROM), flash memory, EPROM memory, EEPROM memory, registers, a hard disk, a removable disk, a CD-ROM and so forth. A storage medium may be coupled to a processor such that the processor can read information from, and write information to, the storage medium. In the alternative, the storage medium may be integral to the processor. A software module may be a single instruction, or many instructions, and may be distributed over several different code segments, among different programs, and across multiple storage media.

The methods disclosed herein comprise one or more actions for achieving the described method. The method and/or actions may be interchanged with one another without departing from the scope of the claims. In other words, unless a specific order of actions is specified, the order and/or use of specific actions may be modified without departing from the scope of the claims.

The functions described may be implemented in hardware, software, firmware, or any combination thereof. If implemented in software, the functions may be stored as one or more instructions on a tangible computer-readable medium. A storage medium may be any available tangible medium that can be accessed by a computer. By way of example, and not limitation, such computer-readable media can comprise RAM, ROM, EEPROM, CD-ROM, or other optical disk storage, magnetic disk storage, or other magnetic storage devices, or any other tangible medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, a computer program product may perform operations presented herein. For example, such a computer program product may be a computer readable tangible medium having instructions tangibly stored (and/or encoded) thereon, the instructions being executable by one or more processors to perform the operations described herein. The computer program product may include packaging material.

Software or instructions may also be transmitted over a transmission medium. For example, software may be transmitted from a website, server, or other remote source using a transmission medium such as a coaxial cable, fiber optic cable, twisted pair, digital subscriber line (DSL), or wireless technology such as infrared, radio, or microwave.

Further, modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C). Further, the term "exemplary" does not mean that the described example is preferred or better than other examples.

Various changes, substitutions, and alterations to the techniques described herein can be made without departing from the technology of the teachings as defined by the appended claims. Moreover, the scope of the disclosure and claims is not limited to the particular aspects of the process, machine, manufacture, composition of matter, means, methods, and actions described above. Processes, machines, manufacture, compositions of matter, means, methods, or actions, presently existing or later to be developed, that perform substantially the same function or achieve substantially the same result as the corresponding aspects described herein may be utilized. Accordingly, the appended claims include within their scope such processes, machines, manufacture, compositions of matter, means, methods, or actions.

What is claimed is:

1. A method for verifying a replicated file system, the method comprising:
    generating a source signature dataset using a host computer system of a data storage environment by traversing through source data blocks of a source file system in such a way that the source signature dataset comprises, for each source data block, a fingerprint of the source data block and a space allocation for the source data block;
    generating a target signature dataset using the host computer system by traversing through target data blocks of a target file system in such a way that the target signature dataset comprises, for each target data block, a fingerprint of the target data block and a space allocation for the target data block; and
    verifying that the target file system is a valid replica of the source file system using the host computer system by verifying the fingerprint and the space allocation for each target data block according to the fingerprint and the space allocation for each respective source data block.

2. The method of claim 1, wherein generating the source signature dataset comprises traversing through the source data blocks of the source file system using substantially sequential disk access.

3. The method of claim 1, wherein verifying that the target file system is a valid replica of the source file system comprises verifying the space allocation for each target data block by:
    determining that the source data block is not allocated according to the space allocation information for the source data block in the source signature dataset;
    determining whether the corresponding data block of the target file system is allocated according to the space allocation information for the corresponding data block in the target signature dataset;
    skipping further verification of the target data block when the corresponding data block of the source file system is determined not to be allocated; and
    recording a discrepancy in the space allocation information for the target data block when the corresponding data block of the source file system is determined to be allocated.

4. The method of claim 1, wherein verifying that the target file system is a valid replica of the source file system comprises verifying the space allocation for each target data block by:
    determining that the target data block is allocated to a set of target file system versions according to the space allocation information for the target data block in the target signature dataset;
    determining whether the corresponding data block of the source file system is allocated to a corresponding set of source file system versions according to the space allocation information for the corresponding data block in the source signature dataset; and
    verifying the space allocation information of the target data block when the corresponding data block of the source file system is determined to be allocated to the corresponding set of source file system versions.

5. The method of claim 4, wherein verifying that the target file system is a valid replica of the source file system comprises verifying the space allocation for each target data block further by:
    recording a discrepancy in the space allocation information for the target data block when the corresponding data block of the source file system is determined not to be allocated to the corresponding set of source file system versions.

6. The method of claim 4, wherein verifying that the target file system is a valid replica of the source file system comprises verifying the space allocation for each target data block, when the corresponding data block of the source file system is determined not to be allocated to the corresponding set of source file system versions, further by:
    modifying the space allocation information of the source signature dataset at least for the corresponding data block according to index table information of the target signature dataset;
    determining whether the corresponding data block of the source file system is allocated to a corresponding set of source file system versions according to the modified space allocation information for the corresponding data block in the source signature dataset;
    recording a discrepancy in the space allocation information for the target data block when the corresponding data block of the source file system is determined not to be allocated to the corresponding set of source file system versions according to the modified space allocation information for the corresponding data block in the source signature dataset; and
    verifying the space allocation information of the target data block when the corresponding data block of the source file system is determined to be allocated to the corresponding set of source file system versions according to the modified space allocation information for the corresponding data block in the source signature dataset.

7. The method of claim 1, wherein verifying that the target file system is a valid replica of the source file system comprises verifying the fingerprint for each target data block by:
   determining whether the fingerprint of the target data block from the target signature dataset matches the fingerprint of a corresponding data block of the source file system from to the source signature dataset; and
   verifying the target data block only when the fingerprint of the target data block from the target signature dataset matches the fingerprint of a corresponding data block of the source file system from to the source signature dataset.

8. The method of claim 7, wherein verifying that the target file system is a valid replica of the source file system comprises verifying the fingerprint for each target data block further by:
   recording a discrepancy in contents of the target data block when the fingerprint of the target data block from the target signature dataset does not match the fingerprint of a corresponding data block of the source file system from to the source signature dataset.

9. The method of claim 1, wherein verifying that the target file system is a valid replica of the source file system comprises performing at least one preliminary check selected from the group consisting of:
   verifying that the source file system is serving as a valid source file system;
   verifying that the target file system is serving as a valid target file system;
   verifying that the target file system is synchronized to a valid version of the source file system;
   verifying that the target file system is associated only with versions of the target file system that correspond to valid versions of the source file system; and
   verifying that the versions of the target file system that correspond to valid versions of the source file system have corresponding timestamp and version identifiers.

10. The method of claim 1, wherein:
    each of the source signature dataset and the target signature dataset comprises replication history information; and
    verifying that the target file system is a valid replica of the source file system comprises verifying that the replication history information of each of the source signature dataset and the target signature dataset has a correct checksum.

11. The method of claim 1, wherein each of the source signature dataset and the target signature dataset comprises at least two of basic file system information, index table information, replication history information, or file system status block information.

12. The method of claim 1, wherein the fingerprint is generated according to at least one of a hash function, a cryptographic function, or a checksum function.

13. The method of claim 1, wherein:
    the source file system comprises a space map block entry for each of the source data blocks of the source file system, the space map block entry configured to indicate an earliest version of the source file system to which the respective source data block is allocated and a latest version of the source file system to which the respective source data block is allocated.

14. The method of claim 13, wherein each space map block entry comprises two values (b, e), where "b" represents the earliest version of the source file system to which the respective source data block is allocated and "e" represents the latest version of the source file system to which the respective source data block is allocated.

15. The method of claim 14, wherein "b" indicates an index table entry corresponding to the earliest version of the source file system to which the respective source data block is allocated.

16. The method of claim 14, wherein "e" indicates an index table entry corresponding to the latest version of the source file system to which the respective source data block is allocated when the latest version is a read-only snapshot of the file system, and "e" is "0" otherwise.

17. A data storage system comprising:
    a plurality of source data blocks representing a source file system, each source data block having an associated content and an associated set of versions of the source file system to which the source data block is allocated;
    a plurality of target data blocks representing a target file system, each target data block having an associated content and an associated set of versions of the target file system to which the target data block is allocated, the target file system being a purported replica of the source file system; and
    a host computer system, in communication with the plurality of source data blocks and the plurality of target data blocks, and configured to:
       generate a source signature dataset by traversing through the source data blocks of the source file system in such a way that the source signature dataset comprises, for each source data block, a fingerprint of the source data block representing associated content of the source data block, and a space allocation for the source data block representing its associated set of versions of the source file system to which the source data block is allocated;
       generate a target signature dataset by traversing through the target data blocks of the source file system in such a way that the target signature dataset comprises, for each target data block, a fingerprint of the target data block representing associated content the target data block, and a space allocation for the target data block representing an associated set of versions of the target file system to which the target data block is allocated; and
       verify that the target file system is a valid replica of the source file system by verifying the fingerprint and the space allocation for each target data block according to the fingerprint and the space allocation for each respective source data block.

18. The system of claim 17, wherein the host computer system is configured to generate the source signature dataset by traversing through the source data blocks of the source file system using sequential or skip-sequential disk access.

19. The system of claim 17, wherein the host computer system is configured to verify that the target file system is a valid replica of the source file system including verifying the space allocation for each target data block by:
    determining that the target data block is allocated to a set of target file system versions according to the space allocation information for the target data block in the target signature dataset;
    determining whether the corresponding data block of the source file system is allocated to a corresponding set of source file system versions according to the space allocation information for the corresponding data block in the source signature dataset;
    verifying the space allocation information of the target data block when the corresponding data block of the source file system is determined to be allocated to the corresponding set of source file system versions; and when the corresponding data block of the source file system is determined not to be allocated to the corresponding set of source file system versions:

modifying the space allocation information of the source signature dataset at least for the corresponding data block according to index table information of the target signature dataset;

determining whether the corresponding data block of the source file system is allocated to a corresponding set of source file system versions according to the modified space allocation information for the corresponding data block in the source signature dataset;

recording a discrepancy in the space allocation information for the target data block when the corresponding data block of the source file system is determined not to be allocated to the corresponding set of source file system versions according to the modified space allocation information for the corresponding data block in the source signature dataset; and verifying the space allocation information of the target data block when the corresponding data block of the source file system is determined to be allocated to the corresponding set of source file system versions according to the modified space allocation information for the corresponding data block in the source signature dataset.

20. The system of claim 17, further comprising:

a plurality of source space map blocks including source space map block entries, each source space map block entry indicating an earliest version of the source file system to which an associated source data block is allocated and a latest version of the source file system to which the associated source data block is allocated; and a plurality of target space map blocks including target space map block entries, each target space map block entry indicating an earliest version of the target file system to which an associated target data block is allocated and a latest version of the target file system to which the associated target data block is allocated.

* * * * *